(12) United States Patent
Simonin et al.

(10) Patent No.: US 12,726,071 B2
(45) Date of Patent: Sep. 1, 2026

(54) GROUNDING BRUSH AND ASSOCIATED ASSEMBLY

(71) Applicant: AKTIEBOLAGET SKF, Gothenburg (SE)

(72) Inventors: Anthony Simonin, Tours (FR); Emmanuel Benevise, Monts (FR); Tommy Jullien, Ambillou (FR); Thomas Perrotin, Saint Roch (FR); Benoît Hauvespre, Saint Etienne de Chigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 219 days.

(21) Appl. No.: 18/536,854

(22) Filed: Dec. 12, 2023

(65) Prior Publication Data

US 2024/0204605 A1 Jun. 20, 2024

(30) Foreign Application Priority Data

Dec. 20, 2022 (FR) ....................................... 2213932

(51) Int. Cl.

*H02K 5/14* (2006.01)
*F16C 41/00* (2006.01)
*H01R 39/24* (2006.01)
*H01R 39/39* (2006.01)

(52) U.S. Cl.

CPC ............... *H02K 5/14* (2013.01); *H01R 39/39* (2013.01); *F16C 41/002* (2013.01); *H01R 39/24* (2013.01)

(58) Field of Classification Search

CPC .......... H02K 5/14; H02K 11/40; H01R 39/39; H01R 39/24; H01R 4/66; F16C 41/002
See application file for complete search history.

(56) References Cited

U.S. PATENT DOCUMENTS

| | | | | |
|---|---|---|---|---|
| 1,496,310 | A * | 6/1924 | Hammer | B65D 41/04 215/337 |
| 3,757,164 | A | 9/1973 | Binkowski | |
| 4,730,876 | A | 3/1988 | Werner et al. | |
| 2005/0040602 | A1 | 2/2005 | Beichl et al. | |
| 2021/0021180 | A1* | 1/2021 | Hubert | F16C 41/002 |
| 2022/0294319 | A1 | 9/2022 | Arnault et al. | |

FOREIGN PATENT DOCUMENTS

| | | |
|---|---|---|
| DE | 3606284 A | 2/1987 |
| GB | 2291939 A | 2/1996 |

OTHER PUBLICATIONS

Preliminary Search Report from the French Patent Office dated Jun. 28, 2023 in related French application No. FR2213932, including Search Report and Written Opinion.
Unpublished U.S. Appl. No. 18/536,875, Anthony Simonin, filing date: Dec. 12, 2023.

* cited by examiner

*Primary Examiner* — Tulsidas C Patel
*Assistant Examiner* — Mohammed Ahmed Qureshi
(74) *Attorney, Agent, or Firm* — J-TEK LAW PLLC; Scott T. Wakeman; Mark A. Ussai

(57) ABSTRACT

A grounding brush includes a plurality of conductive fibers and a support inside which the conductive fibers are mounted. The support includes a mounting portion and two lateral flanks extending from the mounting portion and axially gripping the conductive fibers. Each lateral flank of the support has a free end with a convex surface in contact with the conductive fibers.

16 Claims, 6 Drawing Sheets

GROUNDING BRUSH AND ASSOCIATED ASSEMBLY

CROSS-REFERENCE

This application claims priority to French patent application no. 2213932 filed on Dec. 20, 2022, the entire contents of which are fully incorporated herein by reference.

BACKGROUND OF THE INVENTION

The present invention relates to the field of grounding devices for controlling the shaft current generated in electric motors or machines, and in particular to grounding brush assemblies.

In an electric motor or machine, at least one rolling bearing is mounted between the housing of the electric motor or machine and the rotary shaft so as to support this shaft.

In operation, when the shaft is rotating, a difference in electrical potential can appear between the shaft and the housing of the electric motor or machine, thereby producing an electric current between the inner race of the rolling bearing, which is secured to the shaft, and the outer race secured to the housing.

The electric current passing through the components of the rolling bearing can damage these components, in particular the rolling elements and the raceways formed on the inner and outer rings. Electrical discharges can also generate vibrations.

In order to remedy these drawbacks, it is known practice to ground the rotary shaft by using a grounding brush comprising conductive fibers. The grounding brush is generally mounted in the bore of the housing of the electric motor in such a way that the free ends of the fibers are in radial contact with the outer surface of the rotary shaft.

By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

US Patent Publication No. 2022/0294319A1 discloses a grounding brush assembly comprising a grounding brush provided with a plurality of conductive fibers, a support in which the conductive fibers are mounted, and an annular mounting plate comprising a plurality of retaining tongues for radially and axially retaining the support. The tongues are formed by plastic deformation of the mounting plate. With this type of design, conducting fibers may get cut by the support, thereby causing contamination inside the associated electric motor or machine.

SUMMARY OF THE INVENTION

The present invention aims to remedy the drawback noted above and relates to a grounding brush provided with a plurality of conductive fibers and with a support inside which the conductive fibers are mounted. The support comprises a mounting portion and two lateral flanks extending the mounting portion and axially gripping the conductive fibers.

According to one general feature, each lateral flank of the support is provided, at its free end, with a convex surface in contact with the conductive fibers. With the support designed in this way, the risk of the support cutting the conductive fibers is reduced due to the convex surface at the free end of each lateral flank in the region of contact with the conductive fibers.

Thus, unlike in a conventional brush, there is no sharp cutting edge at the free end of each lateral flank of the support in the area of contact with the conductive fibers. The convex surface of each lateral flank of the support may, for example, have cross sectional profile in the form of a circular arc. Each lateral flank of the support may be provided with an internal frontal face and an external frontal face, the two frontal faces delimiting an axial thickness of the lateral flank.

In a first design, each lateral flank of the support is further provided with a bore, the convex surface connecting the internal frontal face to the bore.

In a second design, the internal frontal face of each lateral flank of the support comprises the convex surface.

In one embodiment, each lateral flank of the support is provided with at least one oblique portion extending obliquely inward from the mounting portion. Each lateral flank of the support may be formed by this oblique portion.

Alternatively, each lateral flank of the support may be further provided with a bent-over lip extending the oblique portion outward, at least the bent-over lip comprising the convex surface.

The present invention further relates to a grounding brush assembly comprising a grounding brush, as defined above, and a brush mounting plate which is secured to the support of the brush.

According to one particular design, the mounting plate comprises a main body and a plurality of retaining tongues for axially and radially retaining the support of the brush and extending from the main body. Alternatively, the mounting plate may be produced as one piece with the main body, such that the mounting plate may be formed without tongues.

The present invention also further relates to an electric motor comprising a housing, a shaft and at least one grounding brush assembly as defined hereinabove and mounted radially between the housing and the shaft, the conductive fibers of the brush of the assembly being in contact with the shaft.

BRIEF DESCRIPTION OF THE SEVERAL VIEWS OF THE DRAWINGS

The present invention will be better understood on studying the detailed description of embodiments, given by way of non-limiting example and illustrated by the appended drawings, in which.

DETAILED DESCRIPTION OF THE INVENTION

Figure 1:
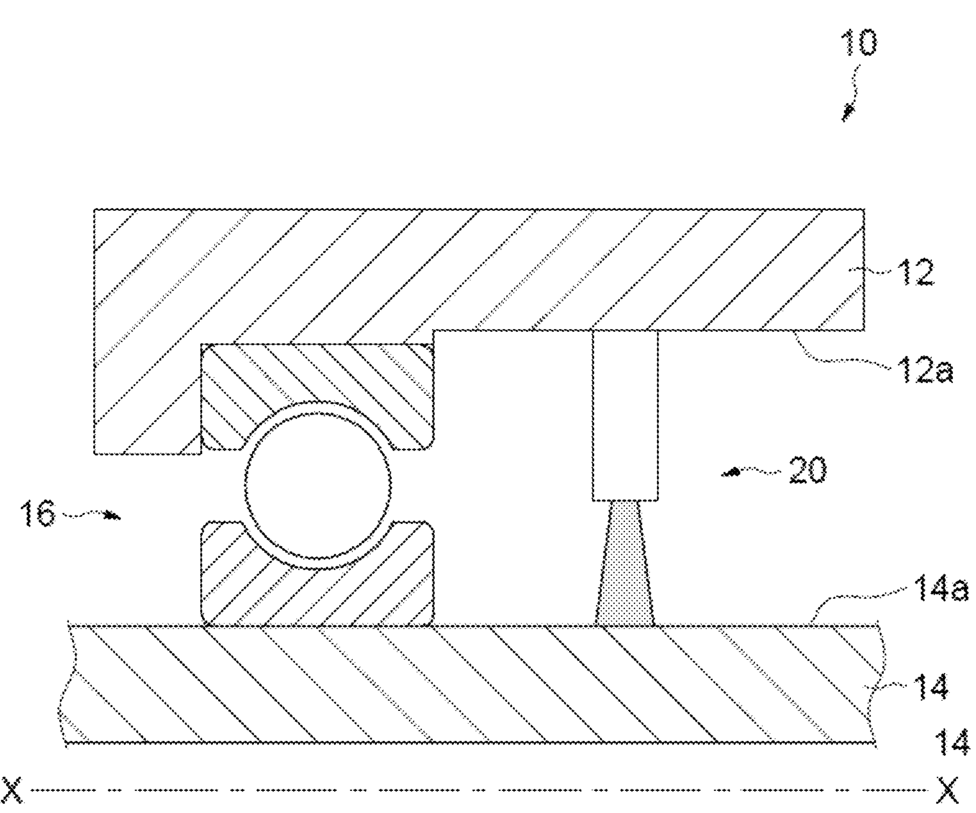
FIG. 1 is a view in axial section of a grounding brush assembly mounted radially between a rotary shaft and a housing of an electric motor.

FIG. 1 shows, in axial section, part of an electric motor 10 or electric machine comprising a fixed housing 12, a rotary shaft 14 rotatable about a central axis X-X, which is supported radially by a rolling bearing 16. In this instance, the bearing 16 is a ball bearing. As an alternative, it is possible to provide other rolling elements, such as cylindrical rollers, tapered rollers, needles, etc., or the bearing 16 may be formed as a journal bearing.

The motor 10 further comprises a grounding brush assembly 20 that is mounted radially between the bore 12*a* of the housing 12 and the outer cylindrical surface 14*a* of the rotary shaft 14. The grounding brush assembly 20 serves to continuously dissipate the electrical charge accumulating on the shaft 14 of the motor 10 when the motor 10 is in operation, by transferring this charge to the housing 12.

Figure 2:
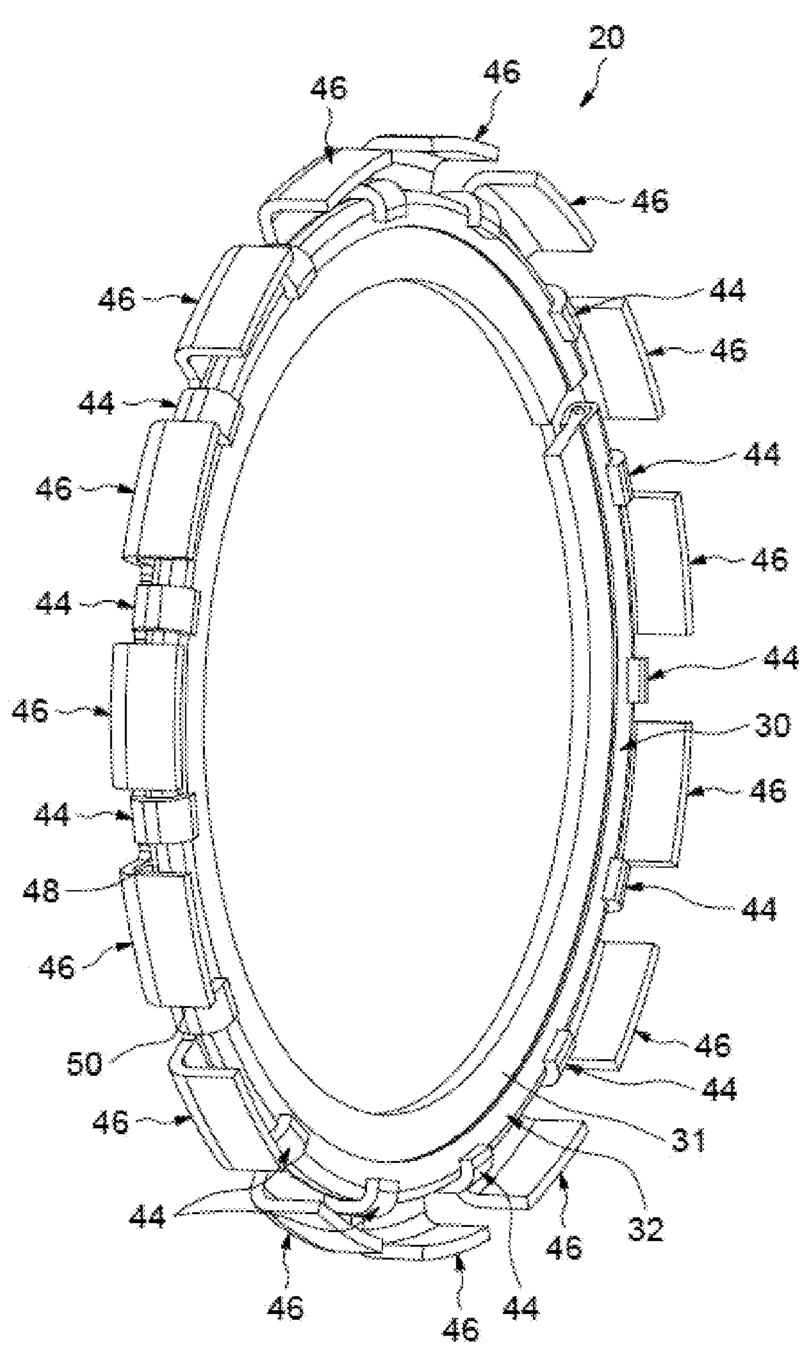
FIG. 2 is a perspective view of a grounding brush assembly according to a first exemplary embodiment of the invention.
Figure 3:
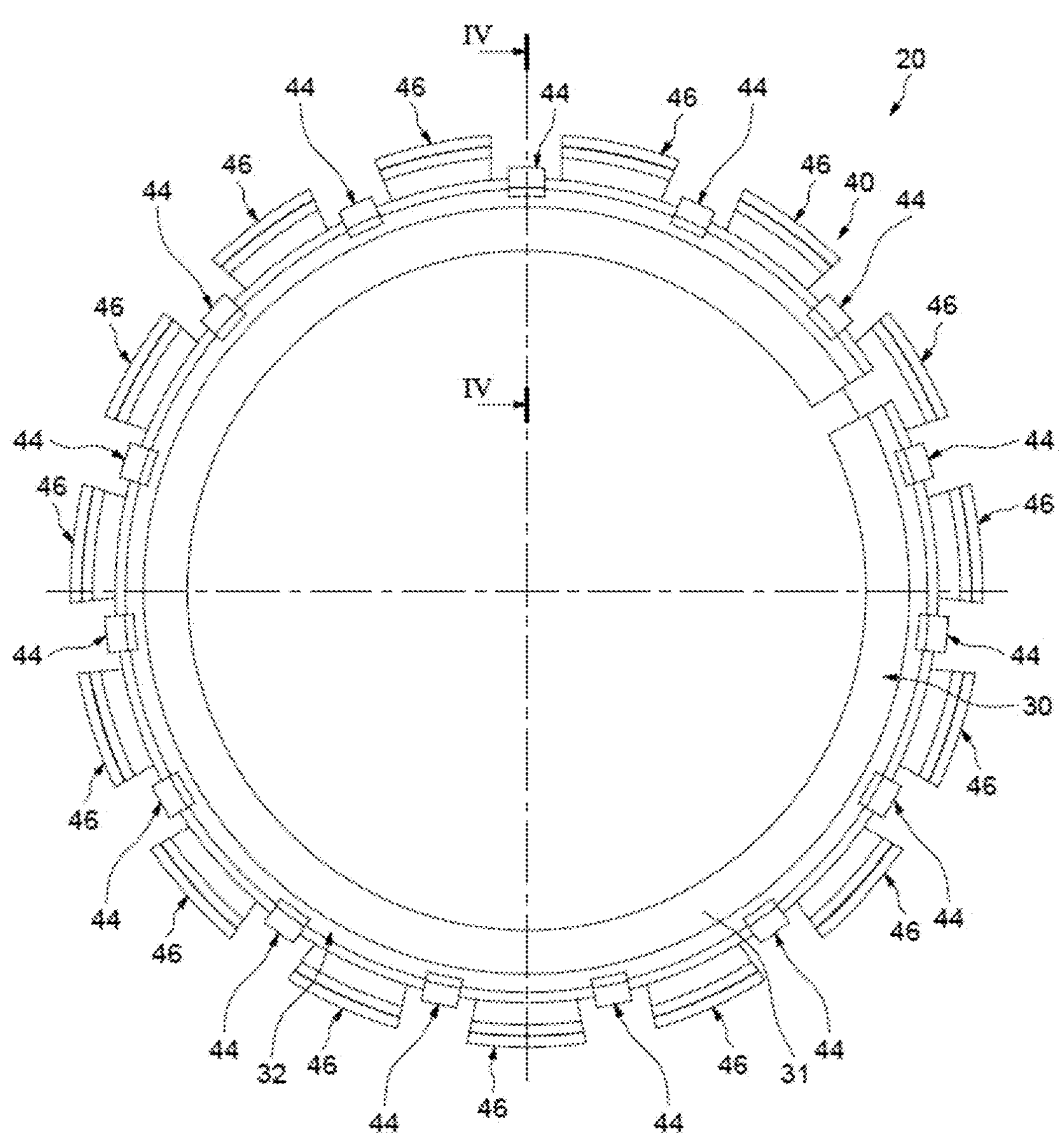
FIG. 3 is a front view of the grounding brush assembly of FIG. 2.

A grounding brush assembly 20 according to a first example of the invention will now be described with reference to FIGS. 2 to 4. As illustrated in FIGS. 2 and 3, the grounding brush assembly 20 has a generally annular shape. The assembly 20 comprises a grounding brush 30 and a brush mounting plate 40 which is configured to axially and radially retain the brush 30.

The brush 30 comprises a plurality of conductive individual fibers 31 which are intended to come around, or be distributed circumferentially about, the rotary shaft 14 of the motor 10. The conductive fibers 31 may be made of carbon, stainless steel or conductive plastics, such as fibers made of acrylic or nylon.

The brush 30 further comprises a holding or support member 32, inside of which the conductive fibers 31 are mounted. In the exemplary embodiment illustrated, the support 32 is in the form of an open ring. The support 32 may be produced by cutting and pressing and is preferably made of an electrically-conductive material, such as for example, aluminum, stainless steel, bronze, copper or any other appropriate material.

Figure 4:
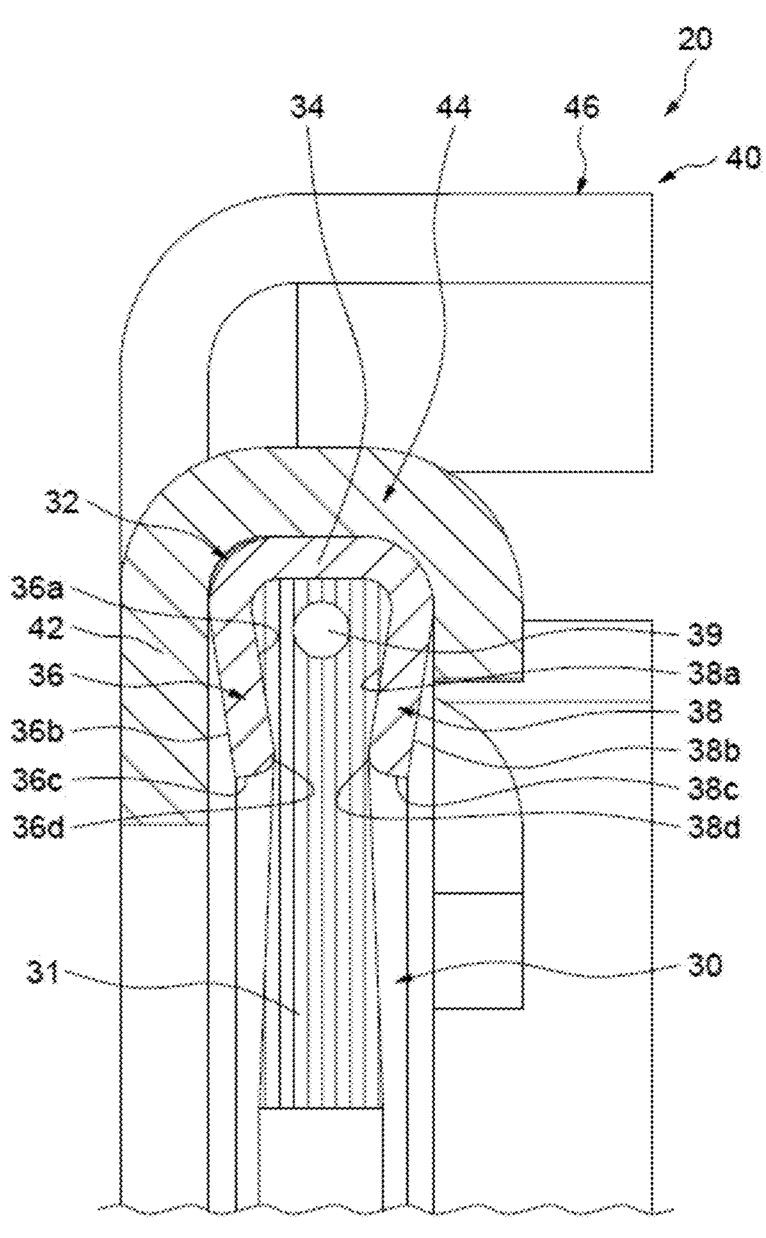
FIG. 4 is a view in section along line IV-IV of FIG. 3.

As best shown in FIG. 4, the support 32 includes an axial mounting portion 34 and two opposite lateral flanks 36, 38 extending inward from the mounting portion 34 and axially gripping the conductive fibers 31. The conductive fibers 31 press axially on each side against the lateral flanks 36, 38.

The mounting portion 34 and the two lateral flanks 36, 38 delimit a channel which is radially open on the inside and inside of which one end, preferably a radial outer end, of the conductive fibers 31 is positioned such that the fibers 31 are spaced circumferentially apart.

In the example illustrated, the conductive fibers 31 are bent around a connecting wire 39 of the support 32. The free distal or inner radial end of the conductive fibers 31 is intended to come into radial contact with the outer surface of the rotary shaft 14 of the motor 10. The proximal or outer radial end of the conductive fibers 31 is in radial contact with the mounting portion 34 of the support 32.

The lateral flank 36 extends from one end of the mounting portion 34 and the lateral flank 38 extends from the opposite end of the portion 34. The two lateral flanks 36, 38 preferably extend obliquely inward from the mounting portion 34. The lateral flanks 36, 38 are symmetrical with each other about a radial midplane (not indicated) of the support 32. The mounting portion 34 preferably extends generally axially, but may alternatively extend obliquely.

As will be described in greater detail hereinafter, the lateral flanks 36, 38 of the support 32 are shaped and formed in such a way as to limit the risk of cutting of the conductive fibers 31.

The brush 30 is in the form of an open ring having a first and second circumferential ends spaced circumferentially apart and facing each other, as shown in FIGS. 2 and 3. Such a circumferential spacing between two ends of the brush 30 allows the brush to adapt to various diameters of the shaft 14 of the motor 10.

Generally, the first and second circumferential ends of the brush 30 are not attached to each other, but may be in contact with one another. Alternatively, the first and second circumferential ends may be connected together.

The mounting plate 40 of the brush 30 includes an annular radial main body 42 and a plurality of retaining tongues 44 extending from the main body 42 and configured to axially and radially retain the brush 30. As described in further detail below, the mounting plate 40 also preferably includes a plurality of mounting and centering sectors or tabs 46 extending from the main body 42.

Referring again to FIG. 4, each tongue 44 extends from the cylindrical outer surface of the body 42. Each tongue 44 locally radially surrounds the support 32 of the brush 30 and is in radial contact with the mounting portion 34 of the support 32. The support 32 of the grounding brush 30 is held axially bearing against the body 42 of the mounting plate 40 by the tongues 44. The tongues 44 serve for, or are configured to, axially and radially retaining the grounding brush 30. The lateral flank 36 of the support 32 bears against the body 42 of the mounting plate 40, and the lateral flank 38 bears against the tongues 44. The tongues 44 are preferably formed identical to one another.

As depicted in FIGS. 2 and 3, the tongues 44 of the mounting plate 40 are preferably spaced circumferentially apart from each other, and preferably in a regular or even manner.

The centering tabs 46 of the mounting plate 40 extend from the main body 42. Specifically, the tabs 46 extend from the cylindrical outer surface of the body 42.

Figure 5:
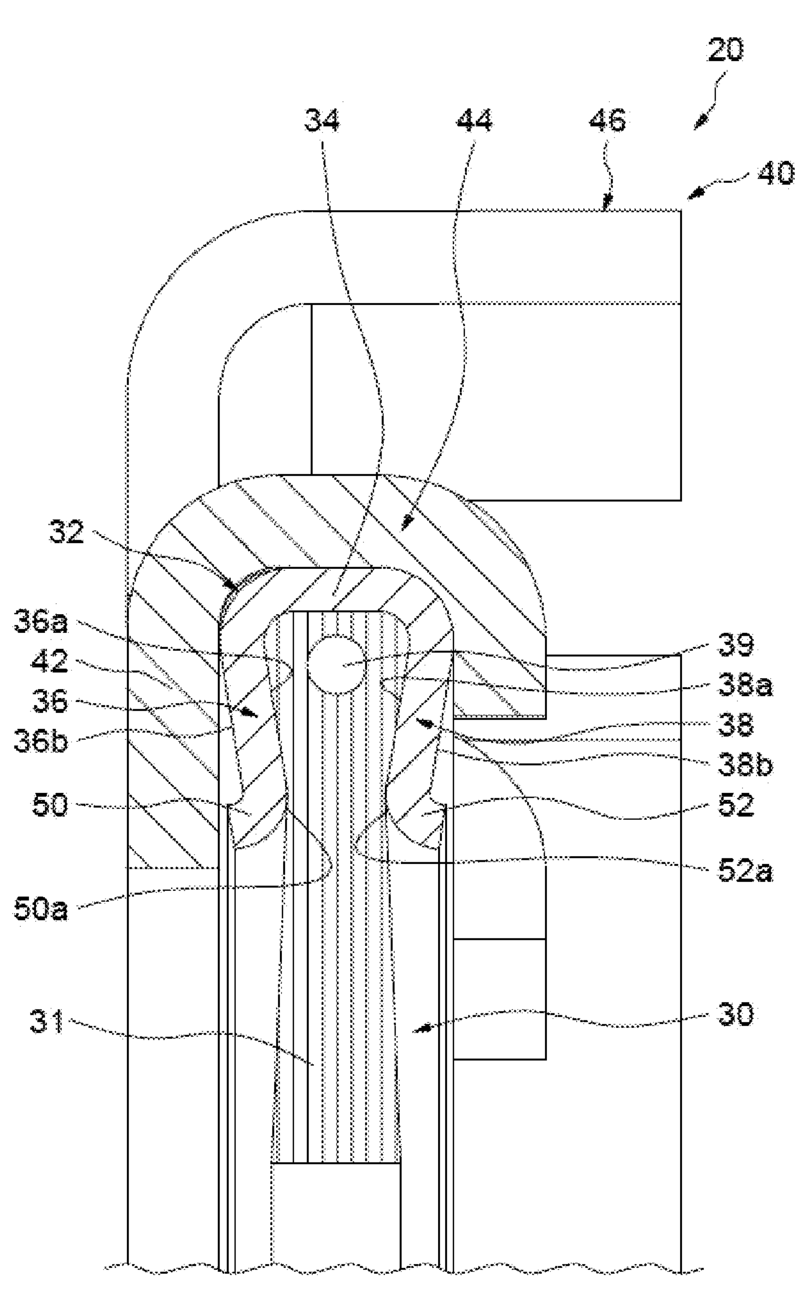
FIG. 5 is a perspective view of a grounding brush assembly according to a second exemplary embodiment of the invention.

With reference to FIG. 5, each tab 46 locally radially surrounds the support 32 of the brush 30 while remaining separated or spaced therefrom. The tabs 46 are partially offset radially outward with respect to the tongues 44. The tabs 46 preferably extend axially from the same side as the tongues 44 and the tabs 46 are preferably identical to each other. Also, the tabs 46 define the outside diameter of the mounting plate 40 and serve to center the mounting plate 40 inside the bore 12*a* of the housing 12.

As illustrated in FIGS. 2 and 3, the tabs 46 are spaced circumferentially apart from each other, preferably in a regular or even manner. Each tab 46 is positioned in the circumferential direction between two immediately successive tongues 44 and is spaced apart in the circumferential direction from each of the two immediately adjacent tongues 44.

The mounting plate 40 is produced by cutting and pressing and is preferably formed of an electrically-conductive material such as aluminum, stainless steel, bronze, copper or any other appropriate material.

Referring once again to the support 32, each lateral flank 36, 38 is provided with an internal frontal face 36*a*, 38*a*, respectively, and an opposing external frontal face 36*b*, 38*b*, respectively, each pair of frontal faces 36*a*/36*b* and 38*a*/38*b* delimiting an axial thickness of the flank 36, 38, respectively. The internal frontal faces 36*a*, 38*a* of the two lateral flanks 36, 38 axially face one another.

Each lateral flank 36, 38 is also provided with a bore 36*c*, 38*c*, respectively, which defines the inside diameter of the flank 36, 38. In the depicted exemplary embodiment, the bore 36*c*, 38*c* of each lateral flank 36, 38 extends obliquely in a direction toward the inside of the support 32 and radially toward the mounting portion 34. Alternatively, the bore 36*c*, 38*c* of each lateral flank 36, 38 may extend at least generally axially.

Each lateral flank 36, 38 is further provided with a convex surface 36*d*, 38*d*, respectively, connecting the internal frontal face 36*a*, 38*a* and the bore 36*c*, 38*c*. That is, the convex surface 36*d*, 38*d* forms a connecting surface extending between the internal frontal face 36*a*, 38*a* and the bore 36*c*, 38*c*. The convex surface 36*d*, 38*d* is situated or located at a free end of the lateral flank 36, 38 and faces toward the inside of the support 32.

The convex surface 36*d*, 38*d* of each lateral flank 36, 38 projects or extends toward the conductive fibers 31. The convex surface 36*d*, 38*d* of each lateral flank 36, 38 has a cross sectional profile of a circular arc, the center of which is situated axially on the opposite side to the conductive fibers 31.

The conductive fibers 31 are in contact with the internal frontal face 36*a*, 38*a* and with the convex surface 36*d*, 38*d* of each lateral flank 36, 38. The curvature of the convex surface 36*d*, 38*d* of each lateral flank 36, 38 limits the risk of the conductive fibers 31 being cut by the support 32.

In this exemplary embodiment, each lateral flank 36, 38 of the support 32 is formed solely as an oblique portion extending obliquely inward from the mounting portion 34. Alternatively, the lateral flanks 36, 38 of the support 32 may be formed having any other appropriate shape.

For example, in the exemplary embodiment illustrated in FIG. 5, in which elements that are identical bear the same reference numbers, each lateral flank 36, 38 of the support 32 is further provided with a bent-over lip 50, 52 extending outward from the oblique portion of the flank 36, 38. Each bent-over lip 50, 52 extends away from the conductive fibers 31 and forms the free end of the flank 36, 38, respectively.

Each bent-over lip 50, 52 is provided with a convex surface 50*a*, 52*a* which faces toward the inside of the support 32 and contacts the conductive fibers 31. The convex surface 50*a*, 52*a* of each lip 50, 52 is formed by bending the lip 50, 52 relative to the oblique portion of the lateral flank 36, 38.

The convex surface 50*a*, 52*a* of each lateral flank 36, 38 projects or extends in the direction of the conductive fibers 31. The convex surface 50*a*, 52*a* of each lateral flank 36, 38 has a cross sectional profile of a circular arc of which the center is situated or located axially on the opposite side to the conductive fibers 31.

The conducting fibers 31 are in contact with the internal frontal face 36*a*, 38*a* and with the convex surface 50*a*, 52*a* of each lateral flank 36, 38. In a similar way to the first exemplary embodiment, the convex surface 50*a*, 52*a* of each flank 36, 38 limits the risk of cutting of the conductive fibers 31.

Figure 6:
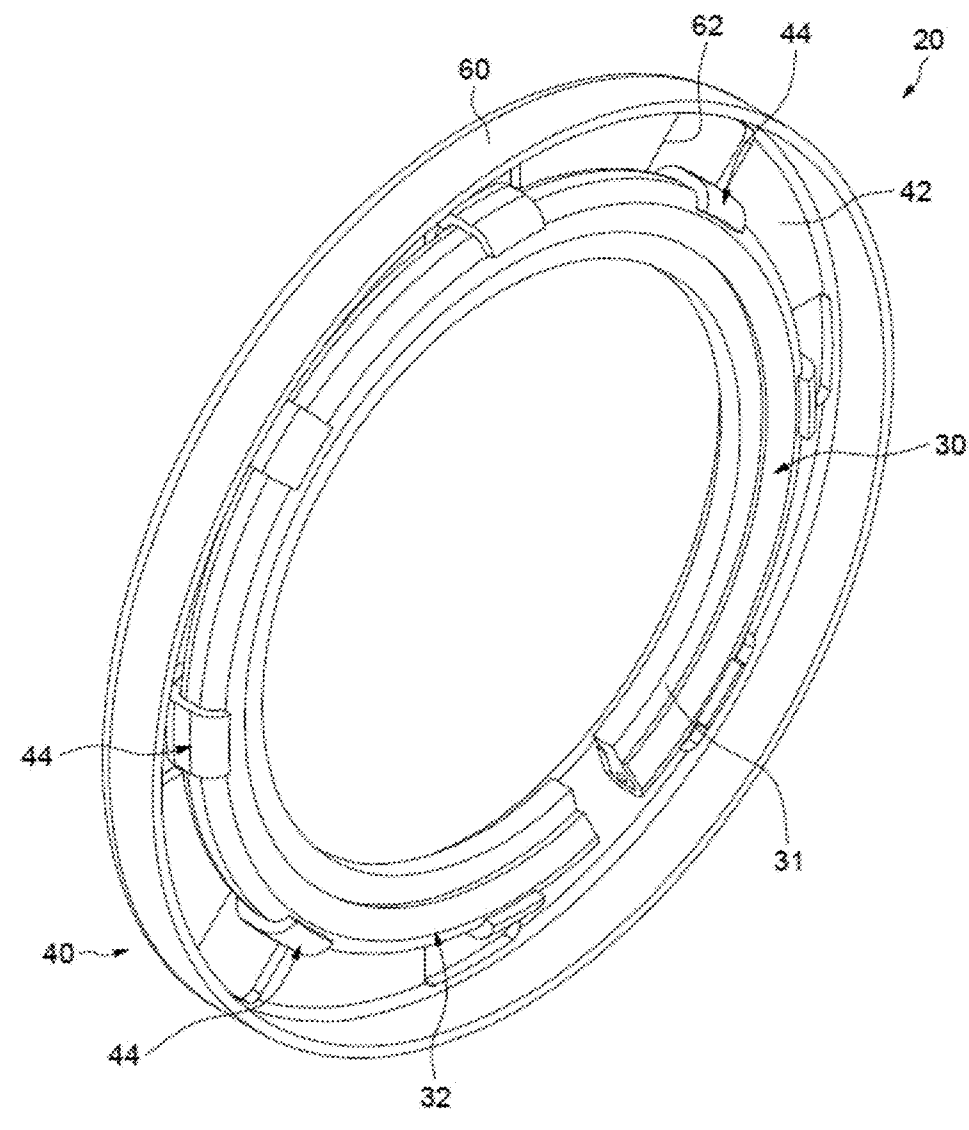
FIG. 6 is a perspective view of a grounding brush assembly according to a third exemplary embodiment of the invention.

In the preceding exemplary embodiments, the mounting plate 40 of the grounding brush assembly 20 includes a plurality of centering tabs. Another exemplary embodiment as illustrated in FIG. 6, in which elements that are identical bear the same references, differs in that these tabs are replaced by an annular flange 60. The flange 60 forms a means for centering the mounting plate 40. In this example, the body 42 is provided with a plurality of through-openings 62 which are formed through an axial thickness of the body 42 and which are spaced apart from one another in the circumferential direction. These openings 62 are formed during the partial cutting of the body 42 to form the tongues 44.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush comprising:

a plurality of conductive fibers; and a support inside of which the conductive fibers are mounted, the support including a mounting portion and two lateral flanks extending from the mounting portion and axially gripping the conductive fibers, each lateral flank having a free end with a convex surface in contact with the conductive fibers, the convex surface of each lateral flank of the support having a cross sectional profile formed as a circular arc.

2. The brush according to claim 1, wherein each lateral flank of the support has at least one oblique portion extending obliquely inward from the mounting portion.

3. The brush according to claim 2, wherein each lateral flank of the support further includes a bent-over lip extending from the oblique portion outward, at least the bent-over lip including the convex surface.

4. The brush according to claim 1, wherein each lateral flank of the support has an internal frontal face and an external frontal face, the internal and external frontal faces delimiting an axial thickness of the lateral flank.

5. The brush according to claim 4, wherein each lateral flank of the support has a bore, the convex surface connecting the internal frontal face with the bore.

6. The brush according to claim 4, wherein the internal frontal face of each lateral flank of the support includes the convex surface.

7. A grounding brush assembly including a grounding brush according to claim 1 and a brush mounting plate secured to the support of the brush.

8. An assembly according to claim 7, wherein the mounting plate includes a main body and a plurality of retaining tongues extending from the main body and configured to axially and radially retain the support of the brush.

9. An electric motor including a housing, a shaft and at least one grounding brush assembly according to claim 8, the grounding brush being mounted radially between the housing and the shaft, the conductive fibers of the brush of the assembly being in contact with the shaft.

10. A grounding brush comprising:

an annular support including a mounting portion with opposing axial ends and two lateral flanks each extending radially inwardly from a separate one of the axial ends of the mounting portion such that an annular channel is defined between the two lateral flanks, each lateral flank having a free inner radial end with a convex surface, the convex surface of each lateral flank of the support having an axial cross section formed as a circular arc; and a plurality of circumferentially spaced conductive fibers each having an outer radial end disposed within the annular channel of the support and an inner radial end contactable with a shaft, the two lateral flanks of the support axially gripping the conductive fibers such that the convex surface of each flank contacts the conductive fibers.

11. The brush according to claim 10, wherein each lateral flank of the support has at least one oblique portion extending obliquely inward from the mounting portion.

12. The brush according to claim 11, wherein each lateral flank of the support further includes a bent-over lip extending outward from the oblique portion and providing the convex surface.

13. The brush according to claim 10, wherein each lateral flank of the support has an internal frontal face and an external frontal face, the internal and external frontal faces delimiting an axial thickness of the lateral flank.

14. The brush according to claim 13, wherein each lateral flank of the support has an inner circumferential surface defining a bore, the convex surface connecting the internal frontal face with the bore.

15. The brush according to claim 13, wherein the internal frontal face of each lateral flank of the support includes the convex surface.

16. A grounding brush comprising:

a plurality of conductive fibers; and a support inside of which the conductive fibers are mounted, the support including a mounting portion and two lateral flanks extending from the mounting portion and axially gripping the conductive fibers, each lateral flank having a free end with a convex surface in contact with the conductive fibers;

wherein each lateral flank of the support has at least one oblique portion extending obliquely inward from the mounting portion and further includes a bent-over lip extending from the oblique portion outward, at least the bent-over lip including the convex surface.

* * * * *